(12) United States Patent
Kojima

(10) Patent No.: US 8,007,111 B2
(45) Date of Patent: Aug. 30, 2011

(54) PROJECTOR HAVING IMAGE PICKUP UNIT, DISTANCE MEASURING UNIT, IMAGE SIGNAL PROCESSING UNIT, AND PROJECTION UNIT AND PROJECTION DISPLAY METHOD

(75) Inventor: Kiyoto Kojima, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 355 days.

(21) Appl. No.: 12/248,172

(22) Filed: Oct. 9, 2008

(65) Prior Publication Data
US 2009/0102987 A1 Apr. 23, 2009

(30) Foreign Application Priority Data

Oct. 22, 2007 (JP) ................................. 2007-273742
Jul. 16, 2008 (JP) ................................. 2008-185041

(51) Int. Cl.
G03B 21/26 (2006.01)
(52) U.S. Cl. ........................................................ 353/28
(58) Field of Classification Search ..................... 353/69, 353/70, 28; 382/289
See application file for complete search history.

(56) References Cited

U.S. PATENT DOCUMENTS

| 7,234,819 B2* | 6/2007 | Nonaka et al. .................. 353/69 |
| 7,369,160 B2 | 5/2008 | Fujino et al. |
| 2004/0198439 A1* | 10/2004 | Kim et al. .................. 455/556.1 |
| 2005/0163396 A1* | 7/2005 | Morichika et al. ............ 382/275 |
| 2009/0091710 A1* | 4/2009 | Huebner ......................... 353/28 |

FOREIGN PATENT DOCUMENTS

| JP | 04-302588 A | 10/1992 |
| JP | 2003-15216 | 1/2003 |
| JP | 2003-087777 A | 3/2003 |
| JP | 2004-023499 A | 1/2004 |

* cited by examiner

Primary Examiner — Thanh X Luu
Assistant Examiner — Danell L Owens
(74) Attorney, Agent, or Firm — AdvantEdge Law Group, LLC

(57) ABSTRACT

A projector includes: an image pickup unit which obtains an image of a subject; an image signal processing unit which cuts an image corresponding to a projection display area of the subject contained in an image obtained by the image pickup unit, and processes an image signal such that the cut image has a predetermined size to produce a projection image signal; and a projection unit which produces an image according to the image signal produced by the image signal processing unit and projects the image.

5 Claims, 9 Drawing Sheets

| h | SCAN RANGE (WXL) | | SIZE OF 1 PIXEL |
|---|---|---|---|
| 1 | 10 | 10 | --- |
| 2 | 20 | 20 | --- |
| 3 | 30 | 30 | --- |
| 4 | --- | --- | --- |
| 5 | --- | --- | --- |
| --- | --- | --- | --- |

FIG. 3

↓ CUT

↓

↓ SCALING (2x2)

PROJECTOR HAVING IMAGE PICKUP UNIT, DISTANCE MEASURING UNIT, IMAGE SIGNAL PROCESSING UNIT, AND PROJECTION UNIT AND PROJECTION DISPLAY METHOD

CROSS REFERENCE TO RELATED APPLICATIONS

The present application claims priority and incorporates herein by reference in its entirety Japanese Patent Application No. 2007-273742 filed Oct. 22, 2007, and Japanese patent Application No. 2008-185041 filed Jul. 16, 2008.

BACKGROUND

Recently, such an image pickup unit type projector has been proposed which includes an image pickup camera for obtaining an image of a subject 6, and a projector main body 2 having the image pickup camera on the bottom and converting an image signal from the image pickup camera into image light to enlarge and project the image via a projection lens 3. The projector having this structure may obtain the image of the subject placed on the bottom of the projector main body 2. For example, see abstract and FIG. 1 of Japanese Patent Publication No. JP-A-2003-15216

When the distance between the camera of the projector and the subject is constant, the size of the image of the subject projected on a screen is kept constant. However, when an image of a display screen on a cellular phone is shot and projected on the screen, for example, the image size varies according to the size of the cellular phone, or the distance or the enlargement rate changes depending on the place of the cellular phone. These conditions may be controlled manually, but the process required for the control is troublesome.

SUMMARY

An embodiment of the disclosure provides a projector and a projection display method capable of obtaining a projection image having a predetermined size even when the distance from a subject changes.

A projector according to at least one embodiment of the disclosure includes: an image pickup unit which obtains an image of a subject; an image signal processing unit which cuts an image corresponding to a projection display area of the subject contained in an image obtained by the image pickup unit, and processes an image signal such that the cut image has a predetermined size to produce a projection image signal; and a projection unit which produces an image according to the image signal produced by the image signal processing unit and projects the image. According to this structure, the image signal processing unit cuts the image corresponding to the projection display area of the subject contained in the image obtained by the image pickup unit, and processes the image signal such that the cut image has the predetermined size to produce the projection image signal (scaling process). Then, the projection unit projects the image corresponding to the image signal. Thus, the projection image having the predetermined size may be produced even when the distance from the subject varies.

The projector according to at least one embodiment of the disclosure further includes a distance measuring unit which measures a distance to the subject. In this case, it is preferable that the image signal processing unit produces an image signal showing the size of the subject image or the size of the pixel of the image signal based on distance information obtained by the distance measuring unit, combines the image signal thus produced and the cut image signal, and produces the projection image signal based on the combined image signal. According to this structure, the image signal showing the size of the subject image or the size of the pixel of the image signal is produced based on distance information obtained by the distance measuring unit, the image signal thus produced and the cut image signal are combined, and the projection image signal is produced based on the combined image signal to project the image on a screen or the like for display. Thus, the projection display area of the subject having the predetermined size is displayed regardless of the size of the projection display area and the distance from the subject. In this case, information showing the size of the subject image or the like is displayed. Thus, the size of the subject is graspable.

A projector according to at least one embodiment of the disclosure includes: an image signal processing unit which inputs an image signal of a subject, cut an image corresponding to a projection display area of the subject contained in an image corresponding to the image signal, processes the image signal such that the cut image has a predetermined size, and produces projection image signal; and a projection unit which produces an image based on the image signal produced by the image signal processing unit, and projects the image thus produced. According to this structure, the image signal processing unit inputs the image signal of the subject by using an external image pickup unit, for example, cut the image corresponding to the image of the projection display area of the subject contained in the image corresponding to the image signal, and processes the image signal such that the cut image has the predetermined size and produces the projection image signal (scaling process). Then, the projection unit projects the image based on the image signal. Thus, the projection image having the predetermined size may be produced even when the distance from the subject varies.

The image signal processing unit inputs distance information showing a distance to the subject, produces an image signal showing the size of the subject image or the size of the pixel of the image signal based on the distance information, combines the image signal thus produced and the cut image signal, and produces the projection image signal based on the combined image signal. According to this structure, the projection display area having the predetermined size is displayed regardless of the size of the projection display area of the subject and the distance from the subject. In this case, information showing the size of the subject image or the like is displayed. Thus, the size of the subject is graspable.

A projection display method according to at least one embodiment of the disclosure includes: obtaining an image of a subject by an image pickup unit; cutting an image corresponding to a projection display area or an arbitrary area contained in the image obtained by the image pickup unit; processing an image signal such that the cut image has a predetermined size and producing a projection image signal; and producing an image based on the projection image signal and projecting the image on a screen. According to this structure, an image of an arbitrary area is manually or automatically cut out. Thus, the cut image is displayed as an image having a predetermined size on the screen or the like regardless of the distance from the subject.

A projection display method according to at least one embodiment of the disclosure includes: inputting an image signal of a subject; cutting an image corresponding to a projection display area or an arbitrary area of the subject contained in an image corresponding to the image signal; processing the image signal such that the cut image has a predetermined size and producing a projection image signal; and producing an image based on the projection image signal and projecting the image on a screen. According to this structure, an image of an arbitrary area is manually or automatically cut out. Thus, the cut image is displayed as an image having a predetermined size on the screen or the like regardless of the distance from the subject.

BRIEF DESCRIPTION OF THE DRAWINGS

Embodiment of the disclosure is described with reference to the accompanying drawings, wherein like numbers reference like elements.

FIG. 3 shows a data table stored in a ROM 25 of an image signal processing unit.

DESCRIPTION OF EMBODIMENTS

First Embodiment

Figure 1:
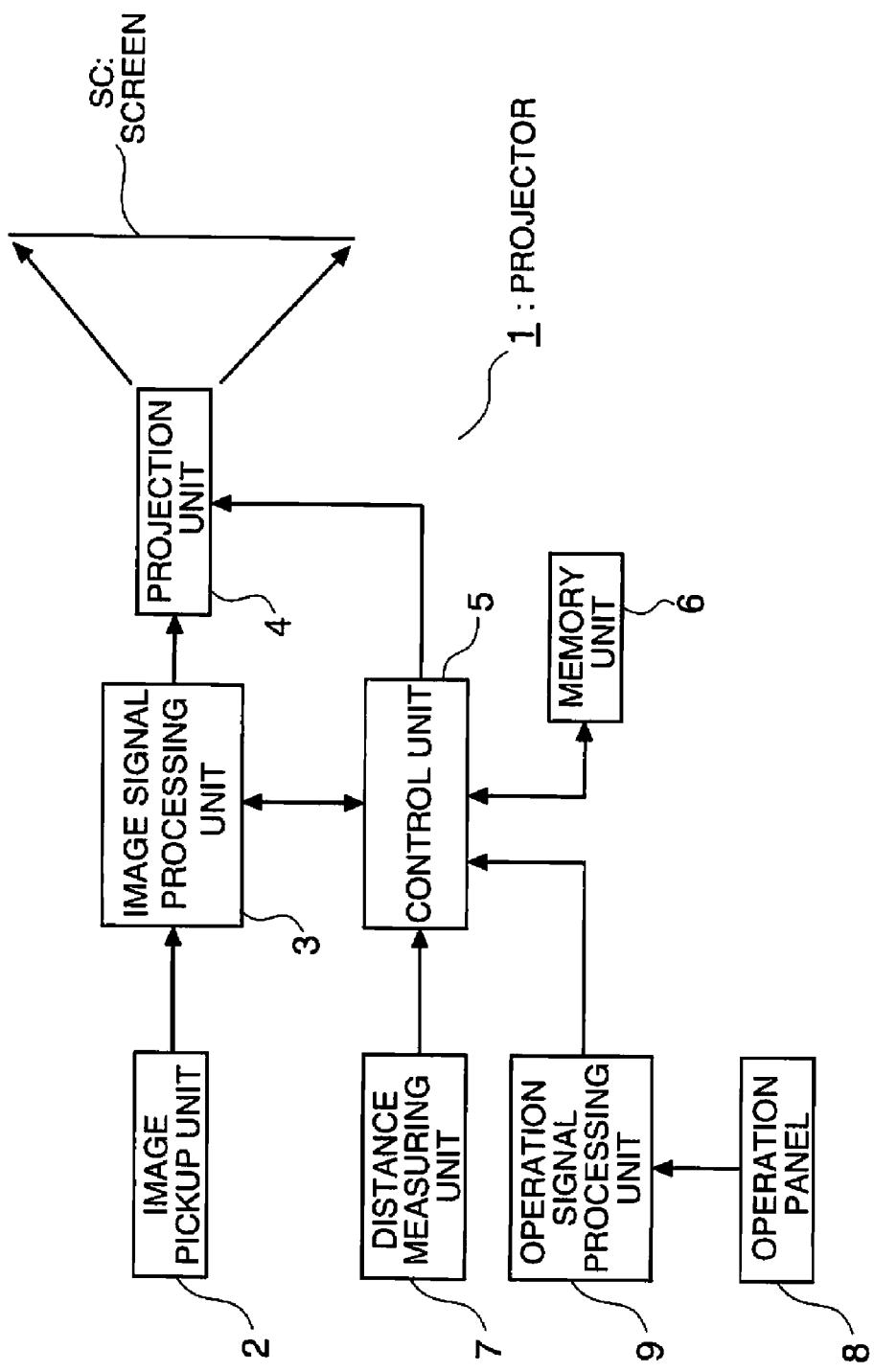
FIG. 1 is a block diagram showing a structure of a projector according to a first embodiment of the disclosure.

FIG. 1 is a block diagram showing a structure of a projector according to a first embodiment of the disclosure.

A projector 1 includes an image pickup unit 2, an image signal processing unit 3, and a projection unit 4. The image pickup unit 2 is constituted by a CCD camera or the like which obtains an image of a subject and output the image signal to the image signal processing unit 3. The image signal processing unit 3 processes the image signal received from the image pickup unit 2 (details of the process will be described later), and outputs the processed signal to the projection unit 4. The projection unit 4 has a light source, a liquid crystal light valve (or DMD (registered trademark): digital micromirror device), a projection optical system and others. The projection unit 4 produces an image corresponding to the image signal received from the image signal processing unit 3, and projects the image on a screen SC for display of the subject.

The projector 1 has a control unit 5, a memory unit 6, a distance measuring unit 7, an operation panel 8, and an operation signal processing unit 9. The control unit 5 controls the overall operations of projector 1 including that of the image signal processing unit 3, and processes various types of signals based on programs, data, and the like stored in the memory unit 6. The distance measuring unit 7 measures the distance from the subject by a distance meter using laser beams or infrared rays, for example. The distance information measured by the distance measuring unit 7 is supplied to the control unit 5. The control unit 5 transfers the distance information to the image signal processing unit 3. The operation signal produced by operation of the operation panel 8 is processed by the operation signal processing unit 9 and inputted to the control unit 5. The control unit 5 processes various types of signals according to the operation signal.

Figure 2:
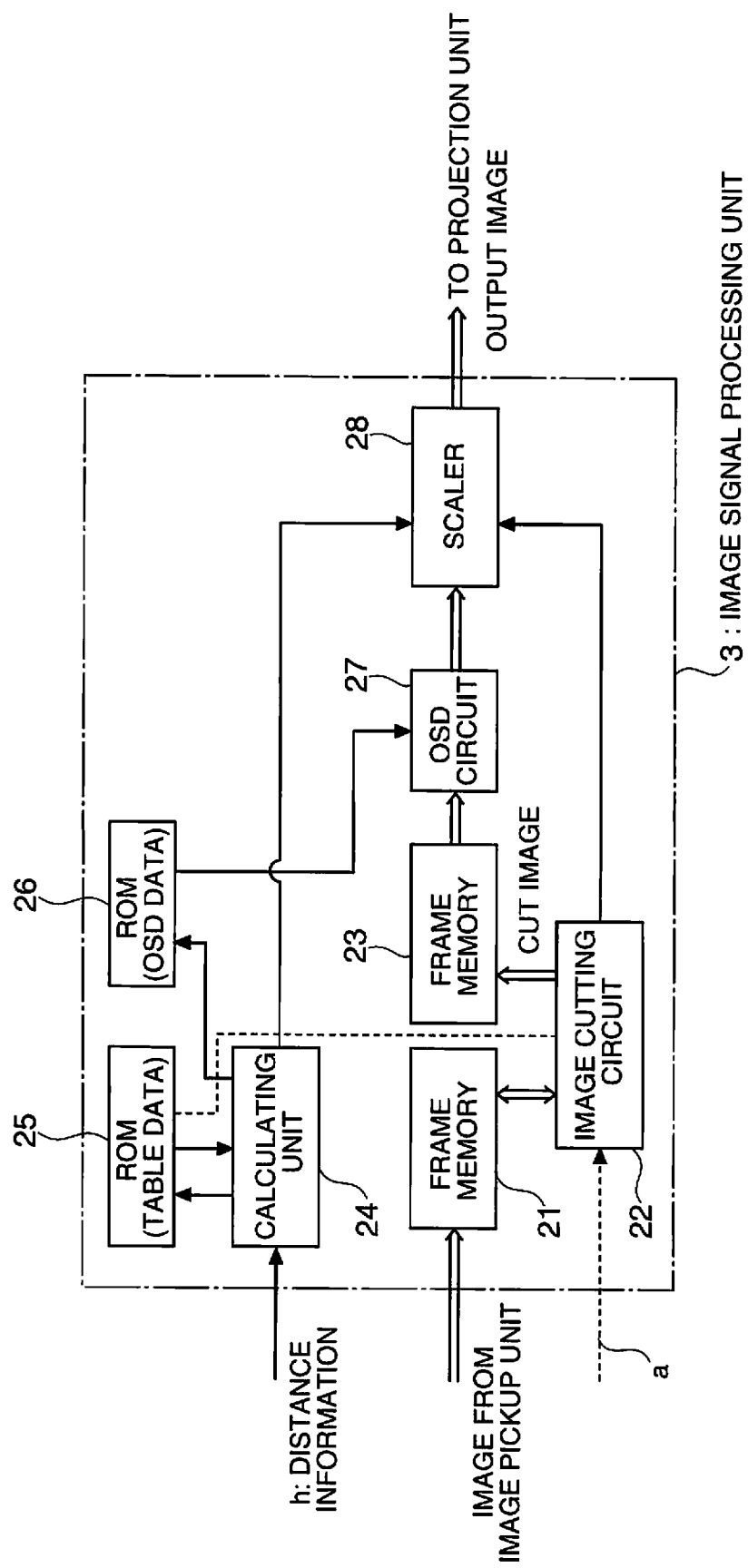
FIG. 2 is a block diagram showing a structure of an image signal processing unit shown in FIG. 1.

FIG. 2 is a block diagram showing the detailed structure of the image signal processing unit 3. The image signal processing unit 3 has a frame memory 21, an image cutting circuit 22, and a frame memory 23 as a structure for processing the image signal received from the pickup unit 2. The image signal processing unit 3 further includes a calculating unit 24, a ROM 25, and a RAM 26, and an OSD (on screen display) circuit 27 as a structure for adding information about the size of the subject to the image obtained by the image pickup unit 2. The image signal combined by the OSD circuit 27 is scaled by a scaler 28 and outputted to the projection unit 4.

The image signal received from the image pickup unit 2 is expanded in the frame memory 21. The image cutting circuit 22 extracts the image signal expanded in the frame memory 21. When the image projection portion corresponds to an area surrounded by an edge portion of the image, for example, the image cutting circuit 22 detects the edge portion of the image, cuts the image signal surrounded by the edge portion, and expands the cut image signal in the frame memory 23. When the calculating unit 24 receives the distance information, the calculating unit 24 extracts information about the size of one pixel corresponding to the distance information from the ROM 25 (details will be described later with reference to FIG. 3), and commands the OSD circuit 27 to output OSD data stored in the ROM 26 to the OSD circuit 27 based on the size information. The OSD circuit 27 superimposes the OSD data on the image signal received from the frame memory 23 and outputs the combined image signal to the scaler 28.

FIG. 3 shows a data table stored in the ROM 25 of the image signal processing unit 3. This data table contains data on scan ranges (image pickup ranges; W×L) and sizes of one pixel relative to distances h. The distances h in the data table shown in FIG. 3 are discrete values. However, when the measured distance does not coincide with any of the distances h in the data table, the calculating unit 24 calculates the size of one pixel by interpolation.

Figure 4A:
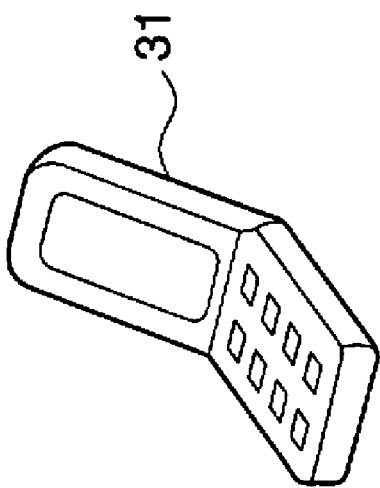
FIG. 4A is a perspective view of a cellular phone as a subject.
Figure 4B:
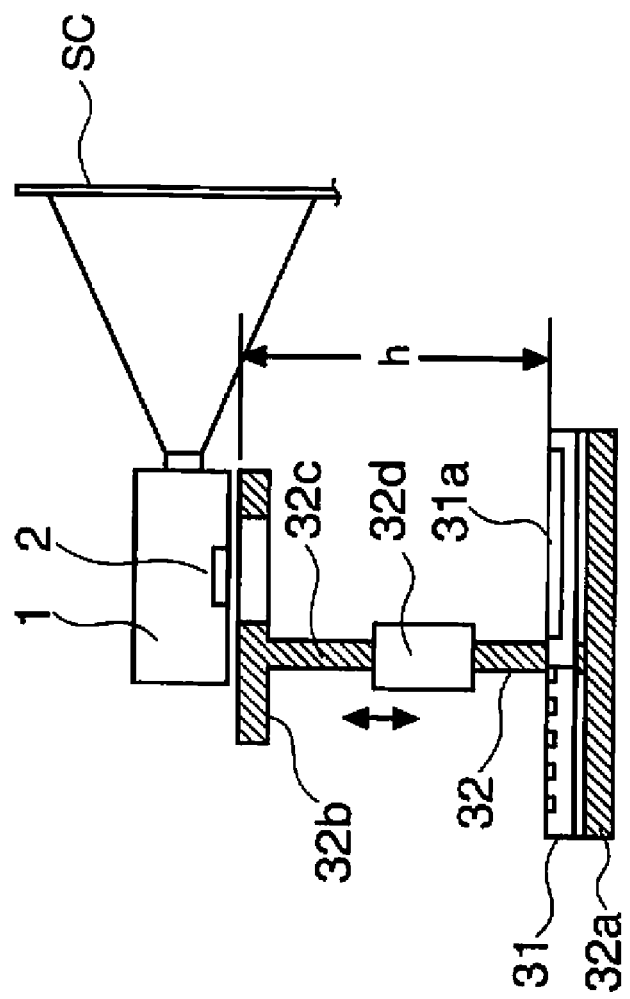
FIG. 4B illustrates a condition in which an image of the cellular phone is shot and projected.

FIG. 4A is a perspective view of a cellular phone 31 as a subject, and FIG. 4B illustrates a condition in which an image obtained by the projector is projected. The cellular phone 31 is installed on a lower stand 32a of an installation stand 32 having an H-shaped cross section, for example, and the projector 1 is installed on an upper stand 32b. An elevating mechanism 32d for raising and lowering the upper stand 32b is attached to a center member 32c of the installation stand 32 such that the distance h between a display screen 31a of the cellular phone 31 as the subject and the image pickup unit 2 of the projector 1 may be controlled.

The operation of the projector 1 having this structure is now described.

FIGS. 5A through 5D illustrate changes of the image obtained by the image pickup unit 2 until the image is outputted to the scaler 28.

Figure 5A:
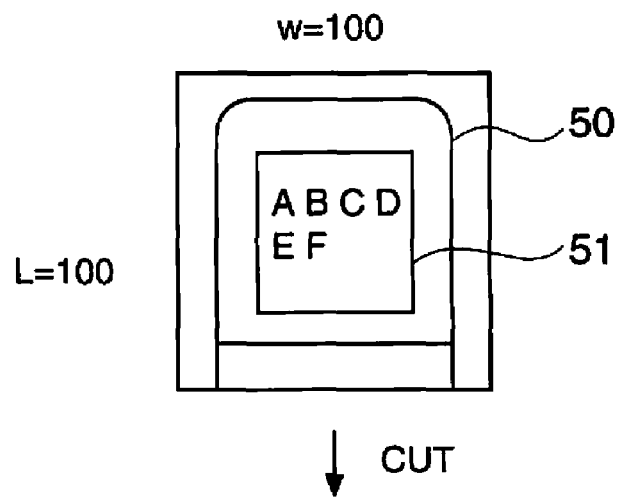
FIGS. 5A through 5D illustrate changes of the image taken by an image pickup unit until the image is outputted from a scaler.
Figure 5B:
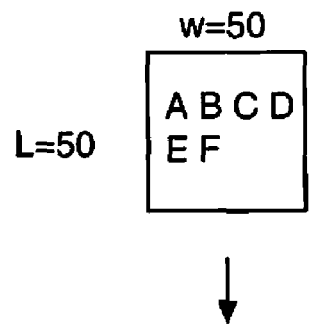

Initially, the projector 1 is installed in a condition shown in FIG. 4B, and the image pickup unit 2 of the projector 1 obtains an image of the display screen 31a of the cellular phone 31. Then, the image thus taken is expanded in the frame memory 21 to obtain an image shown in FIG. 5A. An area indicated by a reference number 51 in an image 50 shown in FIG. 5A corresponds to the display screen 31a (projection display area) of the cellular phone. It is assumed that the scan range (image pickup range) by the image pickup unit 2 in this case has the size of W:100 and L:100. The image cutting circuit 22 extracts the image signal expanded in the frame memory 21, and detects the edge portion of the image (that is, detects an edge 51 of the display screen of the cellular phone). Then, the image cutting circuit 22 cuts the image signal corresponding to the image containing the edge, and expands the cut image signal in the frame memory 23. In this step, an image shown in FIG. 5B is obtained in the frame memory 23. The size of the image in this step is W:50 and L:50, for example. In case of the cutting process of the image signal, the varying portion of lightness or color is detected as the edge portion. At the time of cutting, a certain amount of margin may be provided. When a plurality of edge portions of the image exist, which edge is to be detected is determined and set in the memory unit 6 through the operation panel 8 in advance before the cutting process. The image cutting circuit 22 grasps the size of the entire image and the size of cut image, that is, knows what times the cut image size is needed. Thus, the image cutting circuit 22 outputs magnification information showing what times is needed in the vertical and horizontal directions to the scaler 28. In the above example, twice is necessary in both the vertical and horizontal directions, and information about twice in the vertical and horizontal directions is outputted to the scaler 28.

Figure 5C:
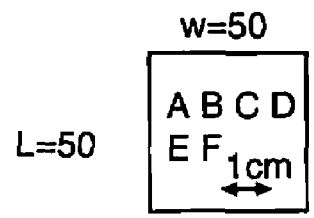

When the distance information is inputted from the distance measuring unit 7 to the calculating unit 24, the size of one pixel corresponding to the distance h is read from the ROM 25, and the OSD data corresponding to the size is inputted from the ROM 26 to the OSD circuit 27. The OSD circuit 27 superimposes the OSD data on the image signal received from the frame memory 23 and outputs the resultant signal to the scaler 28. FIG. 5C shows an image corresponding to the output (image signal) from the OSD circuit. Size information showing the size of the image (image having size of 1 cm in this example) is superimposed on the image signal from the frame memory 23. The scaler 28 scales the image signal outputted from the OSD circuit 27 based on at least the magnification information received from the image cutting circuit 22 or others, and outputs the image signal corresponding to an image shown in FIG. 5D to the projection unit 4. In this example, the output from the OSD circuit 27 is enlarged to have twice larger size both in the vertical and horizontal directions. In this case, the OSD data is also enlarged to have twice larger size both in the vertical and horizontal directions.

Figure 5D:
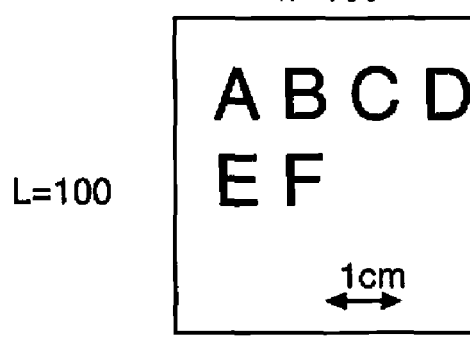
Figure 6A:
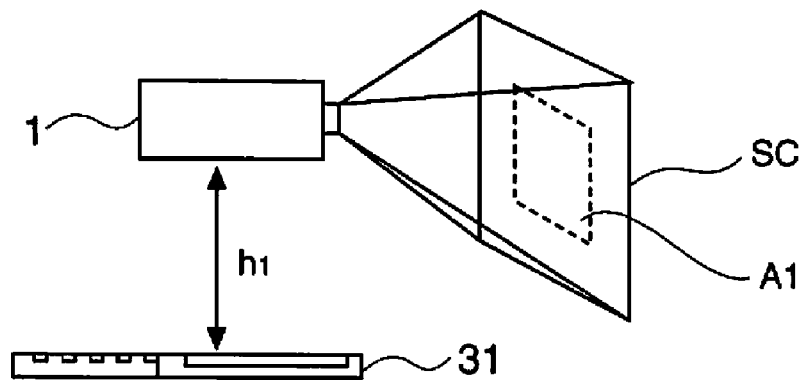
FIGS. 6A and 6B illustrate the relationship between distances between the projector and the cellular phone and a projection image.
Figure 6B:
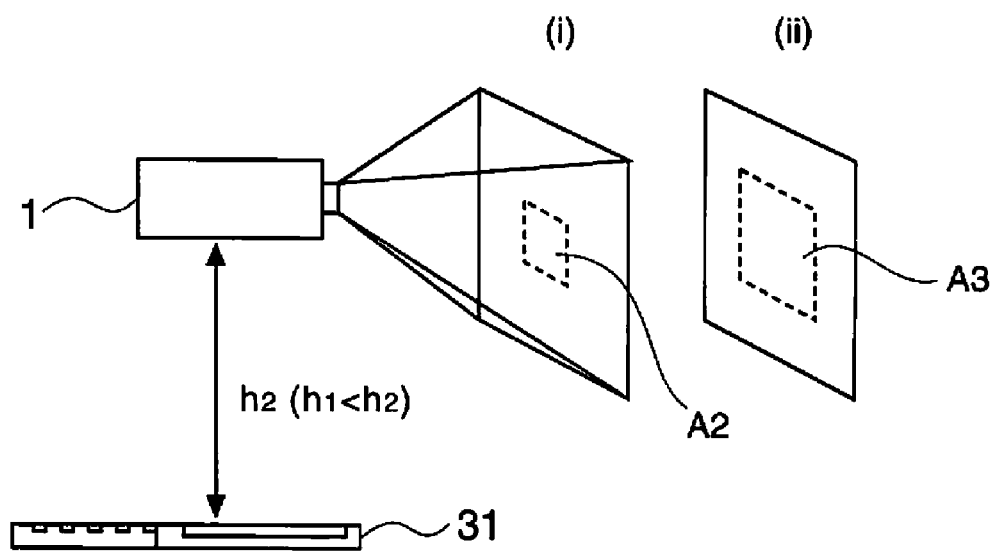

FIGS. 6A and 6B illustrate the relationship between the distance between the projector 1 and the cellular phone 31 and the projection image. As illustrated in FIG. 6A, the image of the subject at the time of a distance h1 is displayed in an area indicated by A1. When the distance h1 is changed to h2 (h1<h2), the image is displayed in an area A2 shown in (i) in FIG. 6B. In this case, the image size decreases. According to this embodiment, however, the image is displayed in an area A3 shown in (ii) in FIG. 6B by processing the image based on the image magnification information in correspondence with the projection distance. Thus, the image having the same size as that of the image shown in FIG. 6A may be obtained. In this case, it is considered that images of the same size are projected on the screen regardless of the size of the subject. In this embodiment, however, size information as contained in the image shown in FIG. 5D is also displayed. Thus, the user may be notified about the size of the subject.

According to this embodiment, therefore, the image cutting circuit 22 cuts the image signal corresponding to the image of the display screen (projection display area) of the cellular phone 31 as the subject contained in the image specified by the image signal produced by the image pickup unit 2. Then, the scaler 28 processes the cut image signal such that the image produced by the cut image signal has a predetermined size and produces the projection image signal, and the projection unit 4 produces an image based on the image signal to project the image on the screen SC for display. Thus, the projection image of the subject having the predetermined size may be constantly obtained even when the distance between the subject and the image pickup unit 2 varies.

Moreover, the distance measuring unit 7 measures the distance to the subject, and the calculating unit 24 produces the image signal representing the size of the pixels of the image based on the distance information. Then, the OSD circuit 27 combines the image signal and the cut image signal, and the scaler 28 produces the projection image signal based on the combined image signal, and the projection unit 4 produces the image based on the image signal for projection to project and display the image on the screen SC. Thus, the size of the projected subject image is graspable.

Second Embodiment

While the image is automatically expanded in the frame memory 23 by the function of the image cutting circuit 22, the cutting process may be manually performed. In this case, the image in the frame memory 21 is initially expanded in the frame memory 23 without change and projected. Then, the user operates the operation panel 8 while viewing the image to execute the process for cutting the image in an arbitrary area or a projection display area established in advance. Subsequently, the operation signal thus produced is inputted to the image cutting circuit 22 of the image signal processing unit 3 via the operation signal processing unit 9 and the control unit 5 (see a dotted line a in FIG. 2), and the image cutting circuit 22 cuts the image signal in the frame memory 21 according to the operation signal and expands the cut image signal in the frame memory 23. The size of the image expanded in the frame memory 23 is controlled by the scaler 28 and outputted to the projection unit 4 similarly to the first embodiment, and the cut image is displayed on the screen SC. The size of the image is kept constant regardless of the distance from the subject. The description in the second embodiment is applicable to the following fourth through sixth embodiments.

Third Embodiment

While laser beams or infrared rays are used by the distance measuring unit in the first embodiment, the distance from the subject may be measured by detecting the amount of rising or lowering of the elevating mechanism 32d shown in FIG. 4B.

While one pixel size data is stored in the data table shown in FIG. 3, the pixel unit stored as size data such as units of 10 pixels, 100 pixels, and 1,000 pixels may be arbitrarily determined and stored according to the disclosure.

According to the first embodiment, the magnification information showing the pixel size is displayed. However, an image signal directly representing the size of the subject may be produced and displayed since the size of the image of subject is known. In addition, the display method is not limited to that shown in FIG. 5D. For example, articles having known sizes may be displayed side by side.

While the display screen of the cellular phone 31 is discussed as an example of the projection display area in the first embodiment, the overall cellular phone 31 may be established as the projection display area. In addition, the subject is not limited to the cellular phone 31 and is changed depending on a user's needs. The description in the third embodiment is applicable to the following fourth through sixth embodiments.

Fourth Embodiment

Figure 7:
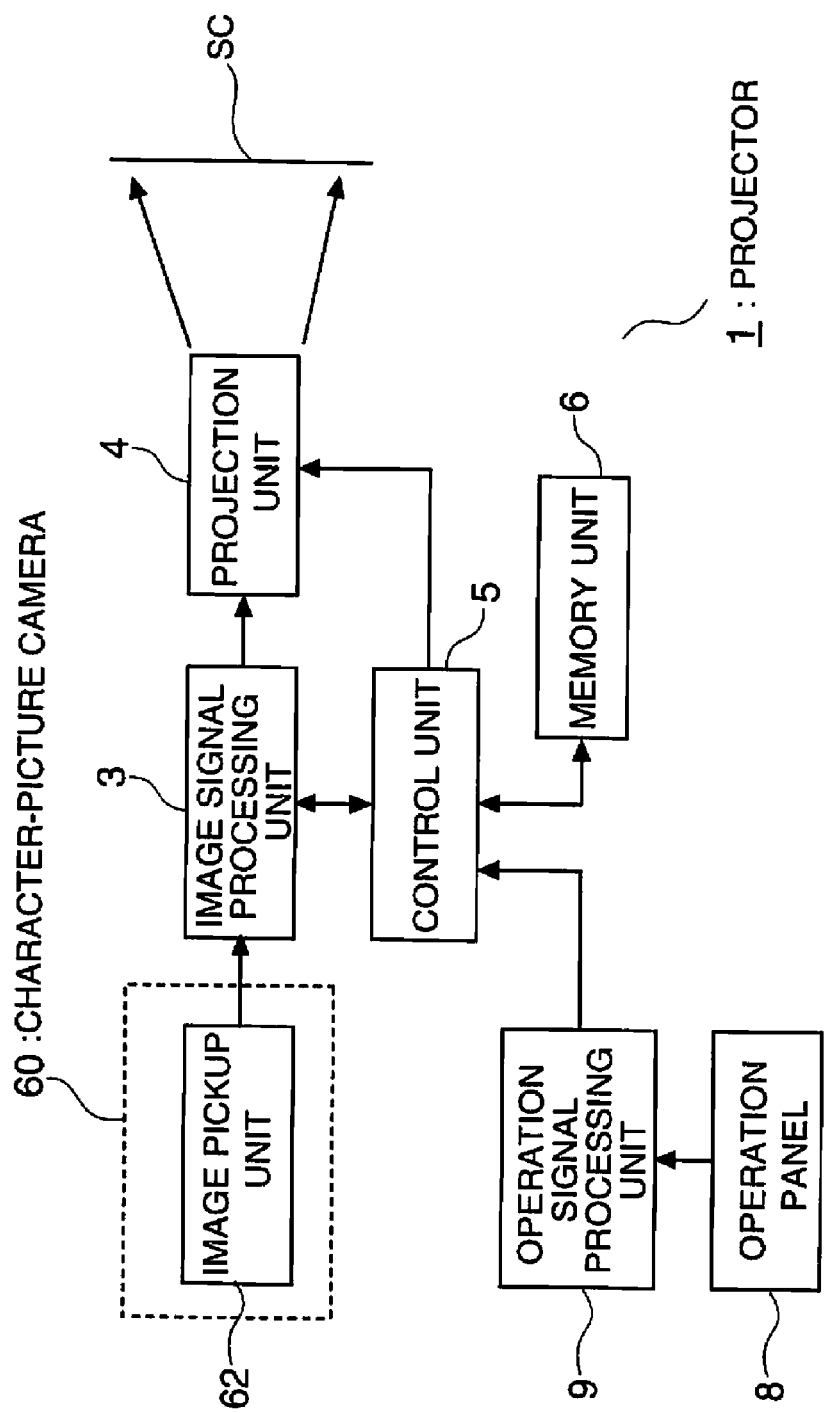
FIG. 7 is a block diagram showing a structure of a projector according to a fourth embodiment of the disclosure.

FIG. 7 is a block diagram showing the structure of the projector according to the fourth embodiment of the disclosure. The projector 1 in this embodiment is different from that in the first embodiment shown in FIG. 1 in that the image pickup unit 2 and the distance measuring unit 7 are not contained. However, the projector 1 in this embodiment receives an image signal from an image pickup unit 62 of an external character-picture camera 60. This difference is now chiefly discussed herein.

The image signal from the image pickup unit 62 of the character-picture camera 60 is supplied to the image signal processing unit 3 of the projector 1 via interface such as video signal, RGB (red, green and blue), HDMI (high-definition multimedia interface), USB (universal serial bus), wire/wireless LAN (local area network), or the like.

The image signal processing unit 3 has the structure shown in FIG. 2 (this applies to the following fifth and sixth embodiments), and processes the image signal received from the image pickup unit 62 of the character-picture camera 60 in the manner similar to that of the embodiments described above (excluding the process based on the distance h received from the distance measuring unit 7). More specifically, the outline of this step is herein explained with reference to the image signal processing unit 3 shown in FIG. 2. The image signal received from the image pickup unit 62 is expanded in the frame memory 21, and the image cutting circuit 22 cuts an image corresponding to the projection display area of the subject contained in the image expanded in the frame memory 21. Then, the image cutting circuit 22 expands the cut image in the frame memory 23, and outputs magnification information to the scaler 28. Subsequently, the scaler 28 scales the image expanded in the frame memory 23 based on the magnification information. By these processes, the image sequentially changes as illustrated in FIGS. 5A through 5C, and the image signal corresponding to the image shown in FIG. 5D (in this case, the portion of the image "1 cm" produced based on the distance h is not included) is outputted to the projection unit 4. Then, the projection unit 4 produces an image corresponding to the image signal and projects the image on the screen SC (in this case, the portion of the image "1 cm" produced based on the distance h is not projected).

According to the fourth embodiment, therefore, the projector 1 extracts the image signal from the character-picture camera 60 and produces an image for projection. Thus, a projection image similar to that in the first embodiment may be obtained even without the image pickup unit contained in the projector 1 in the first embodiment.

Fifth Embodiment

Figure 8:
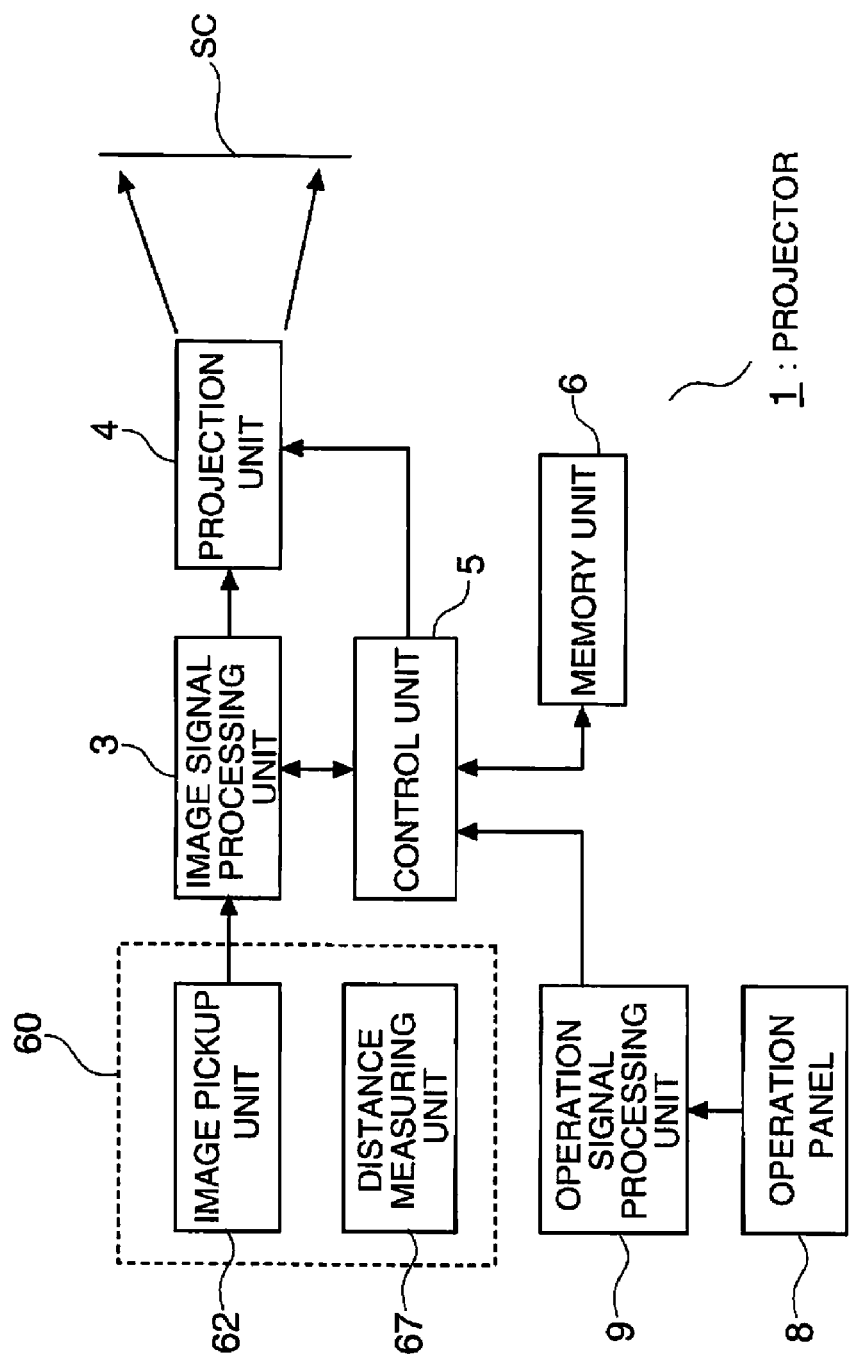
FIG. 8 is a block diagram showing a structure of a projector according to a fifth embodiment of the disclosure.

FIG. 8 is a block diagram showing the structure of a projector according to a fifth embodiment of the disclosure. The projector 1 in this embodiment is different from that in the fourth embodiment shown in FIG. 7 in that the external character-picture camera 60 has a distance measuring unit 67 as well as the image pickup unit 62. Also, the projector 1 in this embodiment is different from that in the first embodiment shown in FIG. 1 in that the projector 1 receives an image signal and distance information from the image pickup unit 62 and the distance measuring unit 67 of the external character-picture camera 60 without using the image pickup unit 2 and the distance measuring unit 7 contained in the projector 1 in the first embodiment.

The distance information from the distance measuring unit 67 of the character-picture camera 60 is supplied to the control unit 5 of the projector 1 via interface such as HDMI (high-definition multimedia interface), USB (universal serial bus), wire/wireless LAN (local area network), or the like.

The image signal processing unit 3 processes the image signal received from the image pickup unit 62 of the character-picture camera 60 in the manner similar to that in the first embodiment. By these processes, the image sequentially changes as illustrated in FIGS. 5A through 5C, and the image signal corresponding to the image shown in FIG. 5D is outputted to the projection unit 4. Then, the projection unit 4 produces an image corresponding to the image signal and projects the image on the screen SC.

According to the fifth embodiment, therefore, the projector 1 extracts the image signal and the distance information from the character-picture camera 60 and produces an image for projection. Thus, a projection image similar to that in the first embodiment may be obtained even without the image pickup unit and the distance measuring unit contained in the projector 1 in the first embodiment.

Sixth Embodiment

Figure 9:
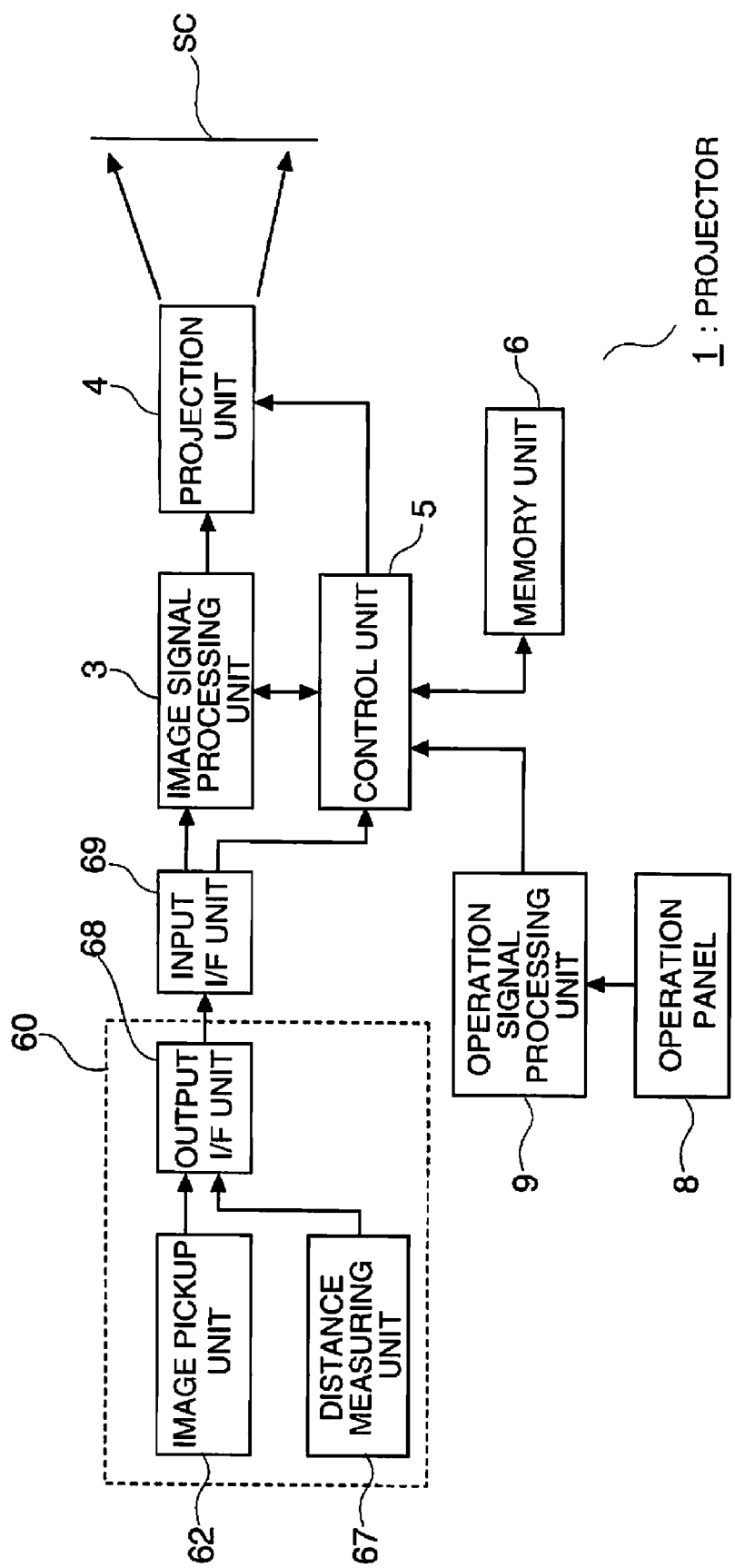
FIG. 9 is a block diagram showing a structure of a projector according to a sixth embodiment of the disclosure.

FIG. 9 is a block diagram showing the structure of a projector according to a sixth embodiment of the disclosure. The projector 1 in this embodiment is different from that in the fifth embodiment shown in FIG. 8 in that the distance information received from the distance measuring unit 67 is transmitted together with the image signal received from the image pickup unit 62. More specifically, the output from the image pickup unit 62 and the output from the distance measuring unit 67 are connected with an output interface unit (hereinafter referred to as output I/F unit) 68. The output from the output I/F unit 68 is connected with an input interface unit (hereinafter referred to as input I/F unit) 69 provided on the projector 1. The output I/F unit 68 and input I/F unit 69 are constituted by USB, HDMI, wire/wireless LAN, or the like.

According to the projector 1 shown in FIG. 9, the image signal from the image pickup unit 62 of the character-picture camera 60 and the distance information from the distance measuring unit 67 are transmitted to the projector 1 via the output I/F unit 68. When the projector 1 receives the image signal and distance information from the character-picture 60 via the input I/F unit 69, the image signal processing unit 3 and the control unit 5 extract the image signal and distance information, respectively. The signal processes performed by the image signal processing unit 3 and the control unit 5 are similar to those in the first embodiment shown in FIG. 1.

According to the sixth embodiment, the image signal and distance signal received from the character-picture camera 60 are transmitted to the projector 1 together. Thus, the communication path between the character-picture camera 60 and the projector 1 may be simplified.

In the fourth through sixth embodiments, the character-picture camera has been discussed as an external image pickup unit. However, the image pickup unit is not limited to the character-picture camera, but may be an ordinary digital camera.

What is claimed is:
1. A projector comprising:
an image pickup unit which obtains an image of a subject having a projection display area;

a distance measuring unit which measures a distance to the subject:

an image signal processing unit which:
- cuts a projection display image corresponding to the projection display area of the subject contained in the image of the subject obtained by the image pickup unit to produce a cut image signal,
- produces a size image signal showing the size of at least a portion of the subject based on the measured distance to the subject,
- combines the cut image signal and the size image signal into a combined image signal such that the size image signal is superimposed on the cut image signal in the combined image signal, and
- processes the combined image signal such that the combined image has a predetermined size to produce a projection image signal; and a projection unit which produces an image according to the projection image signal produced by the image signal processing unit and projects the image.

2. The projector according to claim 1, wherein the size image signal shows at least one of the size of the image of the subject and the size of a pixel of the image of the subject based on distance information obtained by the distance measuring unit.

3. A projector, comprising:

a distance measuring unit which measures a distance to a subject:

an image signal processing unit which:
- inputs an image signal of the subject having a projection display area,
- cuts a projection display image corresponding to the projection display area of the subject contained in an image of the subject corresponding to the image signal to produce a cut image signal,
- produces a size image signal showing the size of at least a portion of the subject based on the measured distance to the subject,
- combines the cut image signal and the size image signal into a combined image signal such that the size image signal is superimposed on the cut image signal in the combined image signal,
- processes the combined image signal such that the combined image has a predetermined size, and
- produces a projection image signal; and a projection unit which produces an image based on the projection image signal produced by the image signal processing unit, and projects the image thus produced.

4. The projector according to claim 3, wherein:
the image signal processing unit inputs distance information from the distance measuring unit showing a distance to the subject,
the size image signal shows at least one of the size of the image of the subject and the size of a pixel of the image of the subject based on the distance information.

5. A projection display method comprising:
obtaining, by an image pickup unit, an image of a subject having a projection display area;
measuring, by a distance measuring unit, a distance to the subject;
cutting a projection display image corresponding to the projection display area of the subject contained in the image of the subject obtained by the image pickup unit to produce a cut image signal;
producing a size image signal showing the size of at least a portion of the subject based on the measured distance to the subject;
combining the cut image signal and the size image signal into a combined image signal such that the size image signal is superimposed on the cut image signal in the combined image signal;
processing the combined image signal such that the combined image has a predetermined size;
producing a projection image signal;
producing an image based on the projection image signal; and
projecting the image on a screen.

* * * * *